United States Patent
Baba

(10) Patent No.: US 8,109,723 B2
(45) Date of Patent: Feb. 7, 2012

(54) DEVICE AND METHOD FOR CONTROLLING WIND TURBINE

(75) Inventor: Mitsuya Baba, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/850,204

(22) Filed: Aug. 4, 2010

(65) Prior Publication Data

US 2011/0293418 A1 Dec. 1, 2011

Related U.S. Application Data

(63) Continuation of application No. PCT/JP2010/058905, filed on May 26, 2010.

(51) Int. Cl.
F03D 7/04 (2006.01)

(52) U.S. Cl. .................... 416/61; 416/1; 416/35

(58) Field of Classification Search .......... 416/1, 35, 416/61; 290/44, 55
See application file for complete search history.

(56) References Cited

U.S. PATENT DOCUMENTS

| | | | | |
|---|---|---|---|---|
| 4,161,658 A | * | 7/1979 | Patrick | 290/44 |
| 4,565,929 A | * | 1/1986 | Baskin et al. | 290/44 |
| 2008/0069692 A1 | | 3/2008 | Oohara et al. | |
| 2008/0284168 A1 | | 11/2008 | Arduini | |
| 2008/0304964 A1 | * | 12/2008 | Yoshida | 416/41 |
| 2009/0148286 A1 | * | 6/2009 | Kammer et al. | 416/31 |

FOREIGN PATENT DOCUMENTS

| | | |
|---|---|---|
| JP | 2006-233912 A | 9/2006 |
| JP | 2007-291976 A | 11/2007 |
| JP | 2008-283747 A | 11/2008 |
| JP | 4365394 B2 | 11/2009 |

OTHER PUBLICATIONS

ISR for PCT/JP2010/058905, mailed Aug. 24, 2010.
Australian Office Action for Application No. 2010276473, mailed Jun. 10, 2011.

* cited by examiner

Primary Examiner — Ninh H Nguyen
(74) Attorney, Agent, or Firm — Kanesaka Berner and Partners, LLP

(57) ABSTRACT

In a conventional technique, a shutdown sequence indicating a sequential operation from a start of the feathering of a wind turbine to the stop is started in response to an alert signal caused by an external factor. In the present invention, when the alert is called off during the shutdown sequence, the shutdown sequence is stopped, and the recovery control by which the pitch angle of the wind turbine blade is controlled toward the fine state is performed. By such a control, the stop period of the wind turbine under the shutdown can be shortened, so that the decrease in the operating rate of the wind farm can be suppressed.

6 Claims, 6 Drawing Sheets

DEVICE AND METHOD FOR CONTROLLING WIND TURBINE

CROSS-REFERENCE TO RELATED APPLICATION

This is a continuation application of International Application No. PCT/JP2010/058905, filed on May 26, 2010.

TECHNICAL FIELD

The present invention relates to a control of a wind turbine for wind turbine generation, and more specifically to a control thereof at the time of a shutdown sequence in accordance with an alert.

BACKGROUND ART

FIG. 1 is a side view showing a structural example of a propeller-type wind turbine for use in a wind turbine generator. A wind turbine 11 is provided with a support 12 fixed to the ground, and a nacelle 13 supported on an upper portion of the support 12. A rotor head 14 is attached to an end of the nacelle 13. A plurality of wind turbine blades 15 is attached to the rotor head 14. Although three wind turbine blades 15 are typically included and thus a configuration including three wind turbine blades will be described herein, the description herein can be applied to cases of including the different number of wind turbine blades 15. A control part 16 controls a blade pitch angle of the wind turbine blade 15 so as to attain a certain rotational speed and output depending on wind conditions. In addition, when an alert is detected, a shutdown control is carried out so as to quickly close the blade pitch angle of the wind turbine blade 15 to immediately stop the wind turbine 11.

When deviating from a normal condition due to external factors, the wind turbine is required to stop until the external factors are eliminated. For example, when a wind speed exceeds a certain condition, when variations in temperature, humidity and system frequency exceed their respective predetermined standards, when an abnormality occurs in a voltage, or when a vibration is generated due to an earthquake, etc., the wind turbine stops for safety in response to a sensor that detects the occurrences and transmits an alert.

The wind turbine stops as follows. The wind turbine converts a force of wind into an electric power during a normal drive thereof. The generated power is converted into an electric power whose characteristics such as the frequency is the same as those of the system power. Thereafter, the generated power is collected for the entire wind farm to which all those wind turbines belong, and then the collected power is interconnected with a system power source.

If any alert is transmitted during the drive, a shutdown sequence, which is configured by a series of controls for completely stopping a wind turbine generation function of the wind turbine, starts in response to a signal indicating the alert. In the shutdown sequence, a break works to exert a breaking force against the rotation of the wind turbine, and then a feathering motion of the pitch starts to move the pitch from a fine side to a feathering position. As a result of the operation, the rotational speed of the wind turbine gradually decreases. When the rotational speed of the wind turbine falls below a predetermined reference value, the wind turbine is blocked out of the power system of the wind farm and thus disconnected. When the wind turbine is disconnected and the pitch reaches the feathering position, the shutdown completes.

The patent document 1 discloses a method for controlling a wind turbine generation system in the case where a system voltage decreases or an overcurrent occurs in a power converter on the system side.

Citation List

Patent Document

Patent Document 1: Japanese Patent Application Publication JP2008-283747A

DISCLOSURE OF INVENTION

In the method disclosed in the above-mentioned Patent Document 1, however, when an alert is generated regarding a certain wind turbine in the wind farm, the wind turbine is controlled to enter into the shutdown sequence and disconnected, thereby being stopped temporarily. If the alert indicates a minor warning due to some external factors so that it is temporal, the alerted factor may be recovered during the shutdown sequence so that the alert may be called off. In such a case, the alert is automatically reset after the wind turbine is temporality shut down, and then the wind turbine is activated. There has been a problem, however, that it takes a long suspend time in the wind turbine.

The present invention is developed to resolve the problem described above, and the purpose thereof is to provide a control apparatus and a control method to suppress decrease in an operating rate due to the shutdown of the wind turbine.

In order to achieve the purpose described above, the present invention provides means as follows.

According to a first embodiment of the present invention, a control apparatus of a wind turbine includes: an alert obtaining part configured to obtain a signal indicating an alert; a shutdown sequence storage part configured to store a sequential operation from a start of a feathering to a stop of the wind turbine as a shutdown sequence; a shutdown start part configured to start the shutdown sequence in response to the signal indicating the alert; and a recovery part configured to perform a recovery control when the alert is called off during the shutdown sequence, wherein by the recovery control, the shutdown sequence is stopped, and a control toward a fine state by which a pitch angle of a wind turbine blade is controlled toward a fine is performed.

As described above, the shutdown sequence is stopped and the pitch angle of the blade is controlled to be returned to be fine. In such a control, the stop period of the wind turbine can be shortened compared to a conventional technique in which the wind turbine is activated after the shutdown is completed and reset.

In the embodiment described above, the control apparatus of the wind turbine may constructed as follows. When the wind turbine is disconnected during the recovery control, after the control by which the pitch angle of the wind turbine blade is controlled toward the fine state is started, the wind turbine is put into synchronization when a rotational speed of the wind turbine becomes higher than a predetermined synchronization standard.

In the embodiment described above, the control apparatus of the wind turbine may constructed as follows. The shutdown sequence is an operation in which the feathering of the wind turbine is started, and after that, the wind turbine is disconnected when the rotational speed of the wind turbine becomes lower than a predetermined standard, and after that, a control of the wind turbine is stopped.

According to a second embodiment of the present invention, a control method of a wind turbine includes: obtaining a signal indication an alert; starting a shutdown sequence indicating a sequential operation from a start of a feathering to a stop of the wind turbine in response to the signal indicating the alert; and performing a recovery control when the alert is called off during the shutdown sequence, wherein by the recovery control, the shutdown sequence is stopped, and a control toward a fine state by which a pitch angle of a wind turbine blade is controlled toward a fine is performed.

In the embodiment described above, the control method of the wind turbine may be constructed as follows. The wind turbine is put into synchronization when a rotational speed of the wind turbine becomes higher than a predetermined synchronization standard. The putting is performed when the wind turbine is disconnected in the recovery control, after the control by which the pitch angle of the wind turbine blade is controlled toward the fine state is started.

In another aspect of the embodiment described above, the control method of the wind turbine may be constructed as follows. The shutdown sequence is an operation in which the feathering of the wind turbine is started, and after that, the wind turbine is disconnected when the rotational speed of the wind turbine becomes lower than a predetermined standard, and after that, a control of the wind turbine is stopped.

The present invention provides the effects in which the suspend time of the wind turbine due to the shutdown thereof can be shortened and decrease in the operating rate of the wind farm can be suppressed.

DESCRIPTION OF EMBODIMENTS

Figure 1:
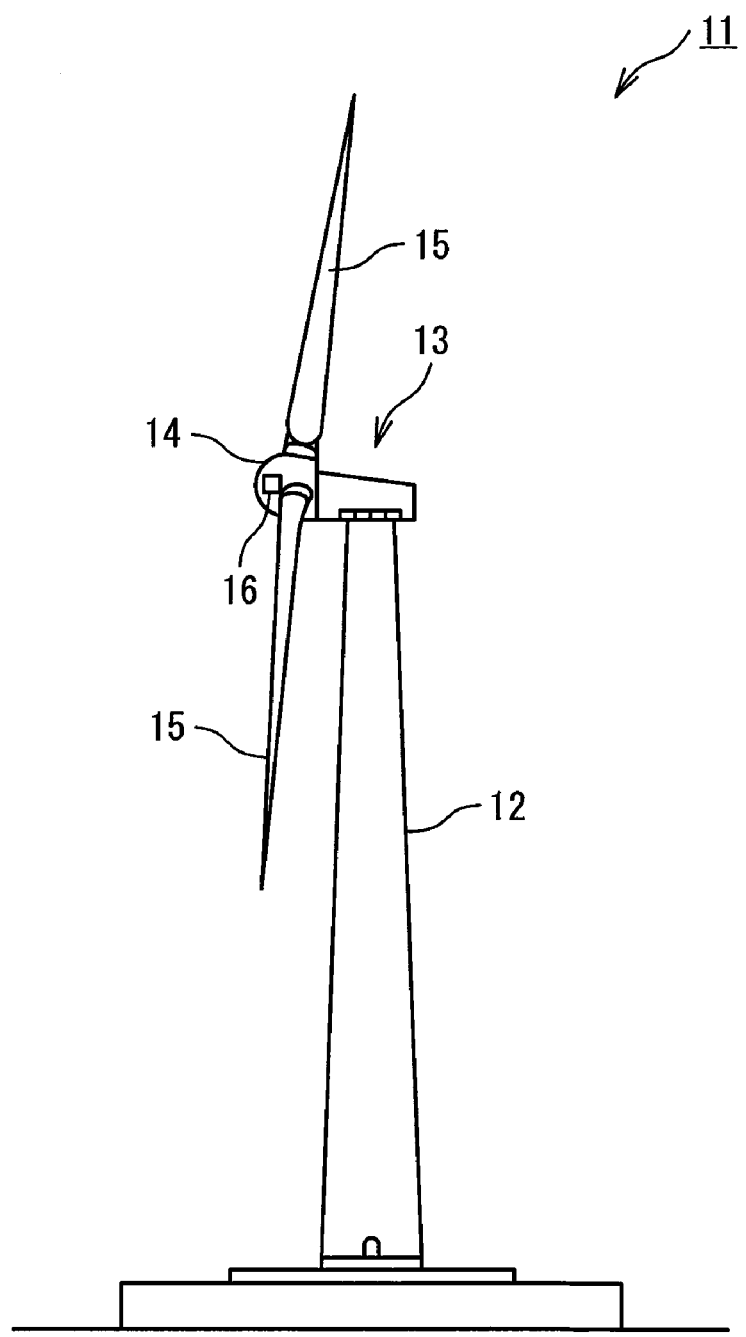
FIG. 1 shows an appearance of a wind turbine.

A device and a method for controlling a wind turbine according to some exemplary embodiments of the present invention at the time of calling off an alert factor will be described below referring to the accompanying drawings. The control apparatus and the control method in this embodiment can be applied to a wind turbine having the configuration illustrated in FIG. 1. First, an example of control when a conventional wind turbine is activated and recovered is explained for describing the present invention.

Figure 2:
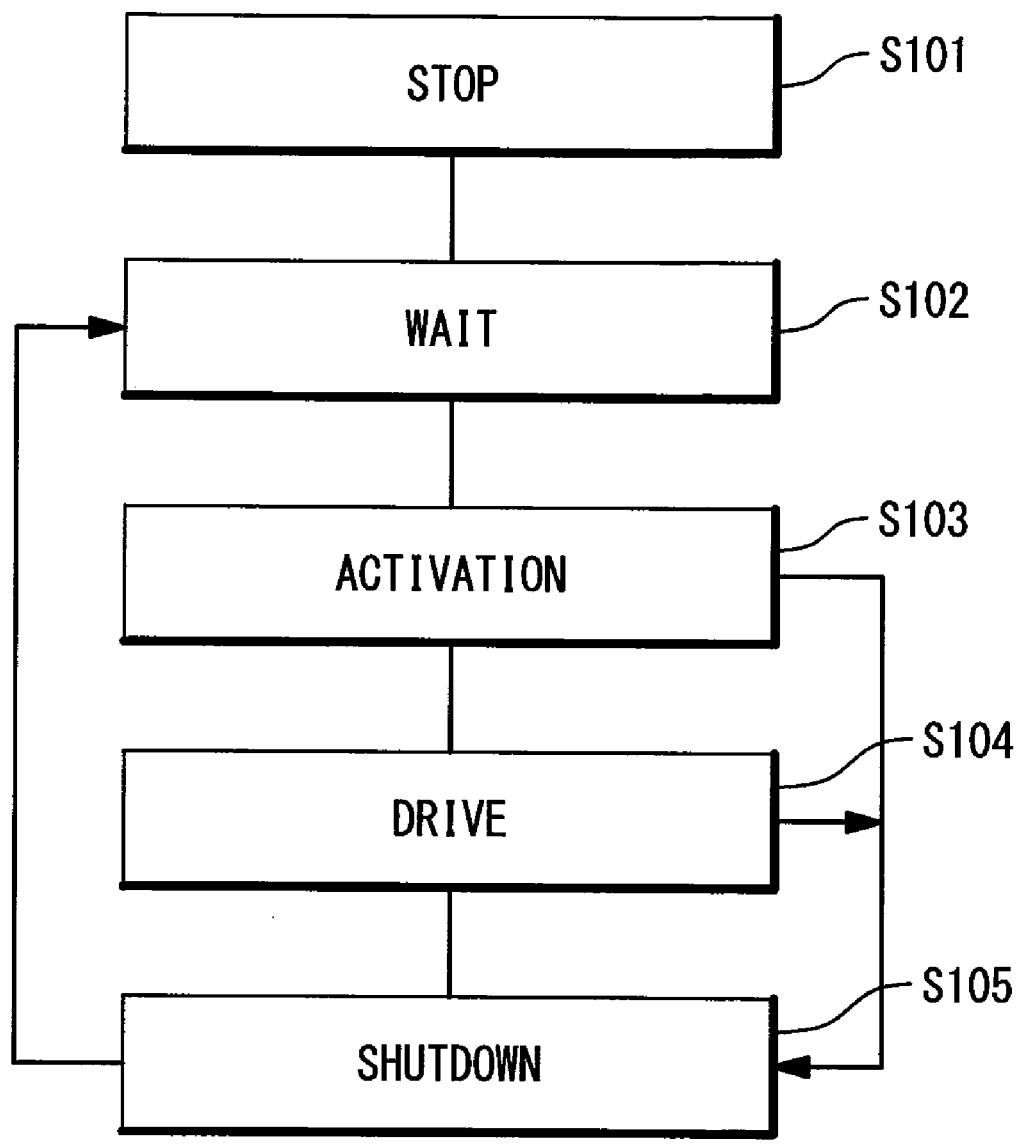
FIG. 2 is a state transition diagram of a conventional wind turbine.

FIG. 2 is a state transition diagram of the wind turbine. A state of the wind turbine moves from a state of being suspended to be out of control (S101) to a standby state (S102). The wind turbine is activated (S103) when receiving a signal instructing its activation. When an alert signal indicating a minor warning is generated based on a detection result of external factors during the activation, the state of the wind turbine moves to a shutdown sequence (S105). When the wind turbine is activated normally, the wind turbine is operated so as to drive the pitch toward a fine side (S104). When the alert signal indicating a warning based on the detection result of external factors is generated during the activation, the state of the wind turbine moves to the shutdown sequence (S105). When the alert signal is generated during the shutdown, the state of the wind turbine moves to the standby state (S102) after the shutdown is completed, and waits for an instruction of the activation.

If the alert is temporary such as a minor warning, the wind turbine can be restarted when the alert factor is recovered. Therefore, the suspend time of the wind turbine can be shorter to enhance an operating rate thereof.

Figure 3:
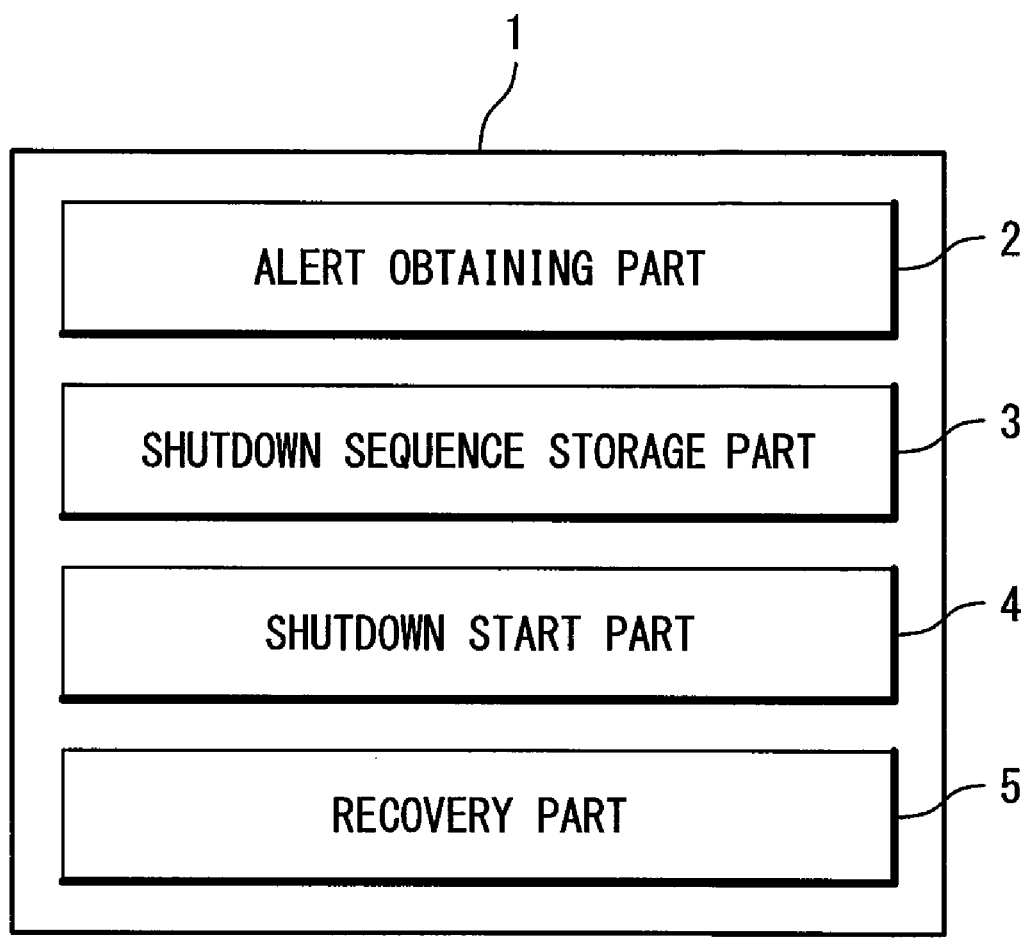
FIG. 3 shows a control apparatus of the wind turbine according to an embodiment of the present invention.

FIG. 3 shows a control apparatus for the wind turbine according to an embodiment of the present invention that enables the enhancement of the operating rate. A control apparatus 1 mounted on the control part 16 of the wind turbine 11 is provided with an alert obtaining part 2, a shutdown sequence storage part 3, a shutdown start part 4, and a recovery part 5. Each of these components is a functional block achieved by a CPU reading and executing a program stored in a storage device. The alert obtaining part 2 obtains a signal indicating an alert, and generates a signal for instructing the shutdown of the wind turbine in response to the alert signal. In this embodiment, the alert signal is generated when a minor external factor occurs that may be recovered in a short time.

The shutdown sequence storage part 3 stores the shutdown sequence (or a trip sequence) that is executed in response to the signal for instructing the shutdown. The shutdown sequence is executed as follows. During the normal drive, the wind turbine is controlled so that the pitch of each blade is on the fine side where the force of wind can be most effectively converted into a torque. The force of wind rotates the wind turbine, and a generator of the wind turbine generates electric power by the rotation. The power is converted into a similar type of power as that of the system power source. The normally driven wind turbines out of a plurality of wind turbines belonging to the wind farm are synchronized with the power system of the wind farm, and the power of the entire wind farm is collected and interconnected with the system power source.

When the shutdown sequence starts, the feathering starts and the pitch is controlled toward a feathering angle. The rotational speed of the wind turbine decreases with the feathering. Furthermore, a breaking force is given to the wind turbine as follows. The wind turbine is provided with a hydraulic system that gives a breaking force to the rotation thereof. The hydraulic system is supplied with an electric power during the normal drive. A solenoid valve is controlled to open a hydraulic break by the electric power, so that the break becomes off. After the disconnection, the supply of the electric power to the hydraulic system is blocked. When supply of the power to the solenoid valve is stopped, the oil in the accumulator is supplied to the break to make the hydraulic break on. As a result, a certain breaking force is thus exerted against the rotation of the wind turbine.

The shutdown sequence start part 4 previously stores a first reference value of the rotational speed. When the rotational speed of the wind turbine falls below the predetermined standard, the disconnection is executed, in which the power system of the generator of the wind turbine is blocked out of the system of the power generated by the wind turbine group in the wind farm. Besides such a control, the control may be employed which carries out the disconnection immediately after the shutdown sequence starts.

After the completion of the disconnection, the wind turbine rotates while the hydraulic break suppresses the rotation or stops. The state of rotating while the rotation is suppressed or stopping is referred to as "stop" that is mentioned in S1 in FIG. 4 described below. That is the state in which the generator of the wind turbine is blocked out of the control system and the power system.

The shutdown sequence storage part 3 stores a shutdown procedure as described in the above example. When the alert obtaining part 2 obtains the alert signal, the shutdown sequence start part 4 starts the shutdown sequence in response to the alert signal. The control apparatus 1 automatically executes a series of operation from starting to stopping of the feathering of the wind turbine in sequence based on the information stored in the shutdown sequence storage part 3.

Figure 5:
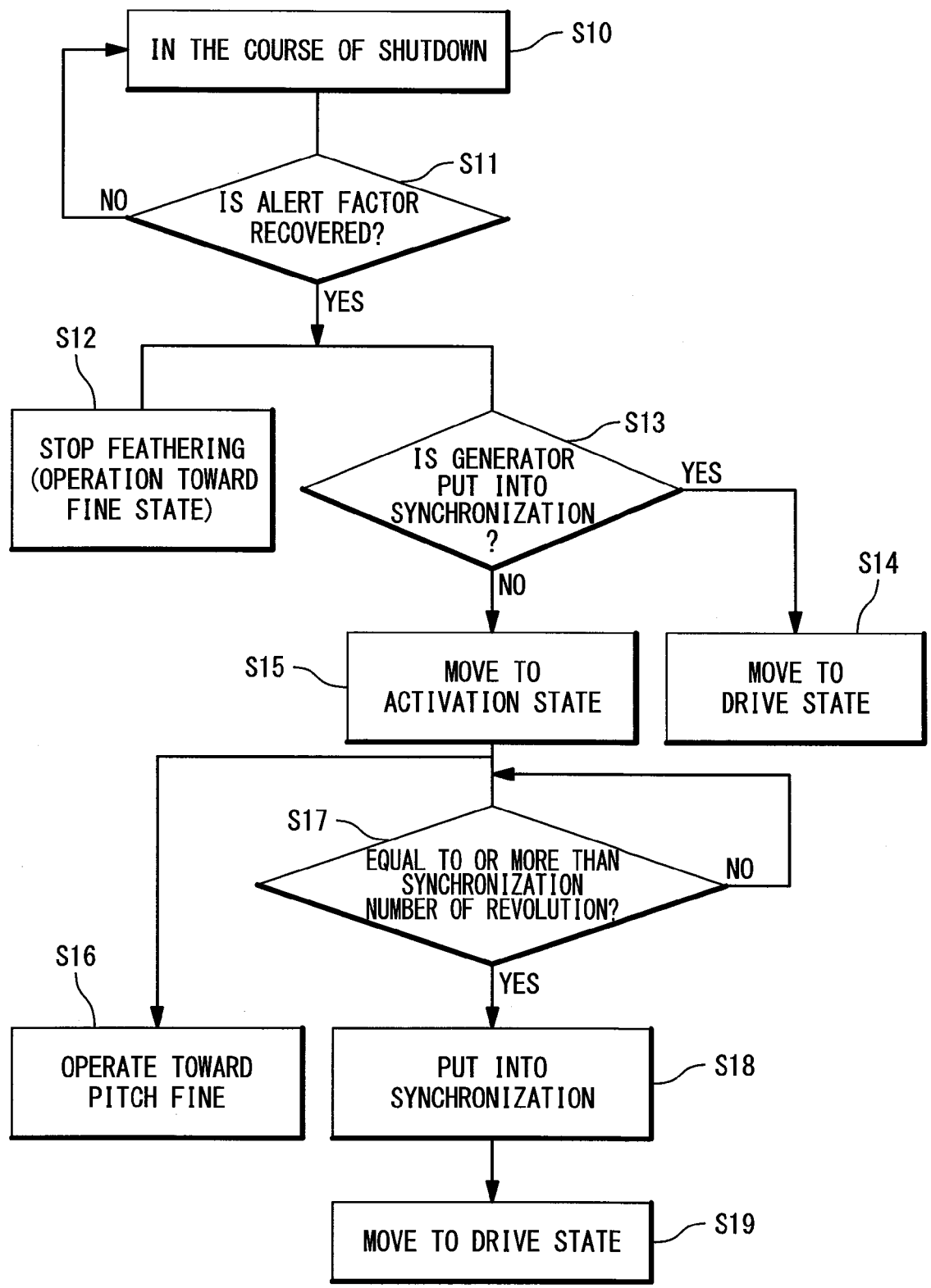
FIG. 5 is a threshold value and a sequence flow showing from the shutdown to the recovery of drive after the alert is called off according to an embodiment of the present invention.

The recovery part 5 quits the shutdown sequence and executes a recovery control when the alert is called off during the shutdown sequence. FIG. 5 shows the operation of the recovery part 5. The recovery part 5 monitors the status of the alert signal in the course of the shutdown (S10). When the alerted factor is not recovered, the recovery part executes the standby processing (S11 NO). When the alerted factor is recovered (S11 YES), the feathering of the pitch is stopped. The control may be started at this point for shifting the pitch toward the fine side (S12). When it is recognized by a synchronization/disconnection flag that the generator of the wind turbine is synchronized with the system (S13 YES), the recovery part 5 makes the state of the wind turbine move to a driving state (S14).

When it is recognized by a synchronization/disconnection flag that the generator of the wind turbine is disconnected from the system (S13 NO), the recovery part 5 makes the state of the wind turbine move to an activation state (S15) and controls the pitch to shift to the fine side (S16). In conjunction with that, the rotational speed of the wind turbine gradually increases. The recovery part 5 executes the standby processing (S17 NO) until the rotational speed of the wind turbine reaches a predetermined synchronization rotational speed. When the rotational speed of the wind turbine reaches the synchronization rotational speed (S17 YES), the recovery part 5 puts the wind turbine into synchronization with the system (S18). The transition to the operational state is completed by this control (S19).

Figure 6:
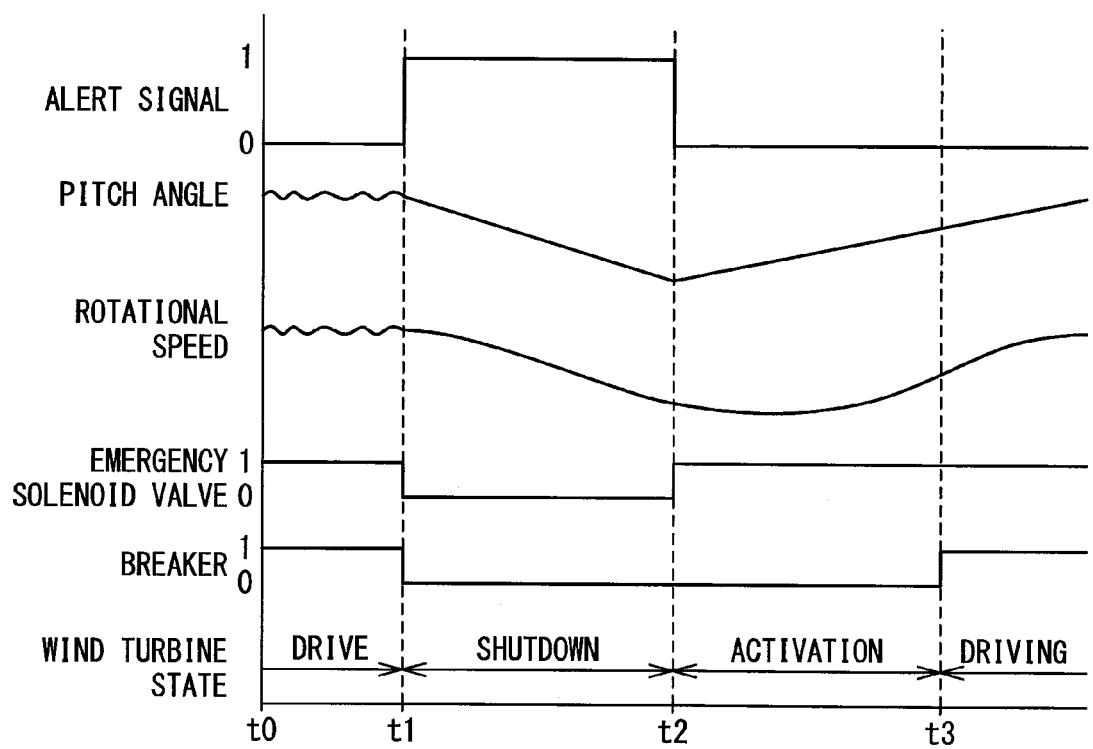
FIG. 6 is a timing chart showing a law of variation of drive control factors of a period from a time before an occurrence of an alert to a time after the calling off of the alert.

Next, the control in this embodiment will be described referring to the state transition diagram in FIG. 4 and the timing chart in FIG. 6. In this example, the wind turbine is promptly disconnected when the alert is generated. The control, in which the state of the wind turbine moves from the suspended state (S1) to the standby state (S2), and then the wind turbine is activated (S3) to be in the driving state (S4), is the same as the aforementioned reference example described with reference to FIG. 2. Furthermore, when the alert is called off after the shutdown is completed, the wind turbine is controlled likewise to be in the standby state (S2), as shown in the path P1 in FIG. 4. In FIG. 6, the time from t0 to t1 shows a driving state. The alert signal is not yet outputted in this state. The pitch angle is on the fine side. The rotational speed is roughly determined depending on the force of wind. An electric power is supplied to an emergency solenoid valve for exerting the breaking force on the wind turbine, so as the wind turbine to be controlled to a state where no breaking force is exerted thereon. The wind turbine receives the force of wind to generate a torque, and the generator converts the torque into the electric power.

The alert signal indicating a power failure, etc., is generated at the time t1 in FIG. 6, and the alert obtaining part 2 shown in FIG. 3 obtains the alert signal. The shutdown start part 4 is triggered by the alert signal to start the shutdown sequence (S5). The wind turbine is promptly disconnected from the power system of the wind farm. The pitch angle is controlled to shift to the feathering side. Furthermore, the emergency solenoid valve is blocked off the power source so as to operate an emergency break, thereby exerting the breaking force against the rotation of the wind turbine. As a result, the rotational speed gradually decreases.

Figure 4:
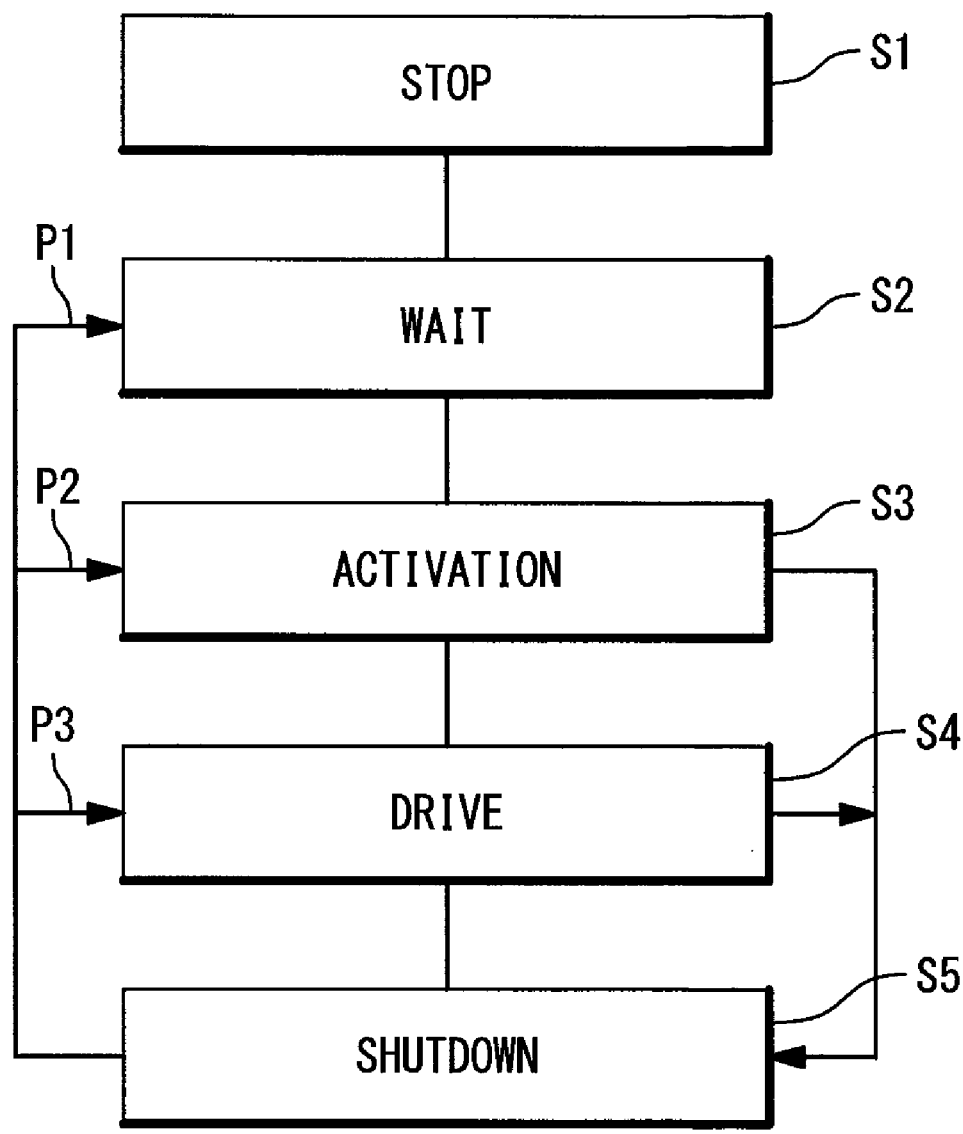
FIG. 4 is a state transition diagram of the wind turbine according to an embodiment of the present invention.

When the alert is called off at time t2 during the shutdown sequence is executed, the control is carried out to achieve the activating state (S3) through the path P2 in FIG. 4. The recovery part 5 quits the shutdown sequence and enters into an activation sequence. In the activation sequence, an electric power is supplied to the emergency solenoid valve to stop exerting the breaking force. The pitch of the blade is controlled to shift to the fine side. The rotational speed of the wind turbine gradually increases. When the rotational speed exceeds a predetermined reference value (the synchronization standard) at time t3, the recovery part 5 puts the wind turbine into synchronization with the power system of the wind farm. The wind turbine is thus in the driving state (S4).

Although a prompt disconnection is done at the time of the generation of alert in the example described above, the alert may be called off before the wind turbine is disconnected in the control in which the disconnection is done after the rotational speed falls below a predetermined reference value after the time of being alerted. In such case, the recovery part 5 makes the state of the wind turbine move to the driving state (S4) via the path P3 in FIG. 4.

According to the control described above, it is possible to restart the wind turbine automatically at a high speed at the time of being alerted even if, for example, a person does not constantly monitor the wind turbine. Furthermore, this function is easily installed since this can be achieved by adding the recovery processing to a normal shutdown sequence. Also, since this control does not require utilizing any uninterruptible power supply unit, it is possible to avoid risks such as a failure of startup of a PLC (Programmable Logic Controller).

Although the present invention has been described above referring to some embodiments, the present invention is not limited to them. Various modifications can be made to the embodiments described above. For example, the embodiments described above can be combined to one another.

EXPLANATION OF REFERENCE NUMERALS

| | |
|---|---|
| 1: | CONTROL APPARATUS |
| 2: | ALERT OBTAINING PART |
| 3: | SHUTDOWN SEQUENCE STORAGE PART |
| 4: | SHUTDOWN START PART |
| 5: | RECOVERY PART |
| 11: | WIND TURBINE |
| 12: | SUPPORT |
| 13: | NACELLE |
| 14: | ROTOR HEAD |
| 15: | WIND TURBINE BLADE |
| 16: | CONTROL PART |

What is claimed is:

1. A control apparatus of a wind turbine comprising:
an alert obtaining part configured to obtain a signal indicating an alert;
a shutdown sequence storage part configured to store a sequential operation from a start of a feathering to a stop of the wind turbine as a shutdown sequence;
a shutdown start part configured to start the shutdown sequence in response to the signal indicating the alert; and a recovery part configured to perform a recovery control when the alert is called off during the shutdown sequence, wherein by the recovery control, the shutdown sequence is stopped, and a control toward a fine state by which a pitch angle of a wind turbine blade is controlled toward a fine is performed.

2. The control apparatus of the wind turbine according to claim 1, wherein when the wind turbine is disconnected during the recovery control, after the control by which the pitch angle of the wind turbine blade is controlled toward the fine state is started, the wind turbine is put into synchronization operation when a rotational speed of the wind turbine becomes higher than a predetermined synchronization standard.

3. The control apparatus of the wind turbine according to claim 1, wherein the shutdown sequence is an operation in which the feathering of the wind turbine is started, and after that, the wind turbine is disconnected when the rotational speed of the wind turbine becomes lower than a predetermined standard, and after that, a control of the wind turbine is stopped.

4. A control method of a wind turbine comprising:

obtaining a signal indication an alert;

starting a shutdown sequence indicating a sequential operation from a start of a feathering to a stop of the wind turbine in response to the signal indicating the alert; and performing a recovery control when the alert is called off during the shutdown sequence, wherein by the recovery control, the shutdown sequence is stopped, and a control toward a fine state by which a pitch angle of a wind turbine blade is controlled toward a fine is performed.

5. The control method of the wind turbine according to claim 4, further comprising:

putting the wind turbine into synchronization operation when a rotational speed of the wind turbine becomes higher than a predetermined synchronization standard, wherein the putting is performed when the wind turbine is disconnected in the recovery control, after the control by which the pitch angle of the wind turbine blade is controlled toward the fine state is started.

6. The control method of the wind turbine according to claim 4, wherein the shutdown sequence is an operation in which the feathering of the wind turbine is started, and after that, the wind turbine is disconnected when the rotational speed of the wind turbine becomes lower than a predetermined standard, and after that, a control of the wind turbine is stopped.

* * * * *